United States Patent
Zhang et al.

(10) Patent No.: US 10,391,438 B2
(45) Date of Patent: Aug. 27, 2019

(54) FILTER ASSEMBLY AND CLEANER HAVING THE SAME

(71) Applicant: Midea Group Co., Ltd., Foshan (CN)

(72) Inventors: Hui Zhang, Foshan (CN); Lele Ming, Foshan (CN); Jizhe Zhang, Foshan (CN); Chaolei Zhang, Foshan (CN); Qian Xu, Foshan (CN)

(73) Assignee: Midea Group Co., Ltd., Foshan, Guangdong (CN)

( * ) Notice: Subject to any disclaimer, the term of this patent is extended or adjusted under 35 U.S.C. 154(b) by 0 days.

(21) Appl. No.: 15/307,913

(22) PCT Filed: May 31, 2016

(86) PCT No.: PCT/CN2016/084158
§ 371 (c)(1),
(2) Date: Oct. 31, 2016

(87) PCT Pub. No.: WO2017/161688
PCT Pub. Date: Sep. 28, 2017

(65) Prior Publication Data
US 2019/0151788 A1    May 23, 2019

(30) Foreign Application Priority Data

Mar. 25, 2016   (CN) .......................... 2016 1 0178975
Mar. 25, 2016   (CN) .................... 2016 2 0240074 U (51) Int. Cl.
*B01D 47/00*   (2006.01)
*B01D 47/02*   (2006.01)
*A47L 9/18*    (2006.01)
*A47L 9/10*    (2006.01)

(52) U.S. Cl.
CPC ............ *B01D 47/021* (2013.01); *A47L 9/106* (2013.01); *A47L 9/18* (2013.01); *A47L 9/185* (2013.01)

(58) Field of Classification Search
CPC .............................. B01D 47/02; B01D 47/021
USPC .................................................... 96/329, 351
See application file for complete search history.

(56) References Cited

FOREIGN PATENT DOCUMENTS

| CN | 2780070  Y | 5/2006 |
| CN | 2788728  Y | 6/2006 |
| CN | 2794416  Y | 7/2006 |
| CN | 101416850 A | 4/2009 |

(Continued)

OTHER PUBLICATIONS

International application No. PCT/CN2016/084158 Brief translation of International Search Report dated Dec. 6, 2016; 2 pages.

(Continued)

*Primary Examiner* — Robert A Hopkins
(74) *Attorney, Agent, or Firm* — Kilpatrick Townsend & Stockton, LLP (57) ABSTRACT

A filter assembly (100) and a cleaner having the same are provided. The filter assembly (100) includes a tank (1) and an air intake pipe (2). The tank (1) is configured to accommodate a liquid therein and has an air inlet (13) and an air outlet (14). The air intake pipe (2) is connected to the air inlet, has an air output end (22) located in the tank (1) and extending towards the liquid (A) or submerged in the liquid (A), and has a cross sectional area gradually increased along a fluid flow direction inside the air intake pipe (2).

20 Claims, 3 Drawing Sheets

(56) References Cited

FOREIGN PATENT DOCUMENTS

| | | | |
|---|---|---|---|
| CN | 201290645 Y | 8/2009 | |
| CN | 201701153 U | 1/2011 | |
| CN | 202288136 U | 7/2012 | |
| CN | 203263297 U | 11/2013 | |
| CN | 203619478 U | 6/2014 | |
| CN | 105708392 A | 6/2016 | |
| CN | 205625810 U | 10/2016 | |
| EP | 121475028 A2 | 11/2004 | |
| EP | 1707098 A2 * | 10/2006 | ............. A47L 5/362 |
| GB | 2516915 A | 2/2015 | |

OTHER PUBLICATIONS

International application No. PCT/CN2016/084158 International Search Report and Written Opinion dated Dec. 6, 2016; 12 pages.
Chinese Patent Application No. No. 201610178975.2, English translation of Rejection Decision dated Dec. 29, 2016; 4 pages.
Chinese Patent Application No. No. 201610178975.2 Rejection Decision dated Dec. 29, 2016; 4 pages.
Chinese Patent Application No. No. 201610178975.2, English translation of First Office Action dated Sep. 26, 2016; 7 pages.
Chinese Patent Application No. No. 201610178975.2, First Office Action dated Sep. 26, 2016; 7 pages.

* cited by examiner

FILTER ASSEMBLY AND CLEANER HAVING THE SAME

RELATED APPLICATIONS

This U.S. application is a U.S. National Phase application of the International Patent Application No. PCT/CN2016/084158, filed May 31, 2016, which claims the benefit of prior Chinese Applications No. 201620240074.7, filed Mar. 25, 2016 and No. 201610178975.2, filed March 25, 2016. The entire contents of the before-mentioned patent applications are incorporated by reference as part of the disclosure of this U.S. application.

FIELD

The present disclosure relates to a field of cleaning equipment, and more particularly to a filter assembly and a cleaner having the same.

BACKGROUND

A filtering water tank is a core member of a water filtration cleaner, and uses clean water as filter materials, so as to replace structures such as a dust cup or a dust box that are commonly used in a traditional cleaner, without replacing consumables including dust bags or HEPA meshes additionally. Moreover, dust can be significantly filtered out by water, and the water mixed with the dust can be dumped directly without generating the problem of dust raising, thereby achieving an effect of ultimate cleaning. Since an air intake pipe serves as an important member in the filtering water tank, a performance of the air intake pipe directly influences a filtering capacity of water to a dust-laden air and a subsequent water-air separation effect.

The air intake pipe in the related art may be configured as a circular pipe or rectangle pipe having a constant cross section. However, since such air intake pipe is configured to have a constant sectional shape, big dust-laden bubbles equal to the cross section of the air intake pipe in size will be introduced into the water, and these bubbles are difficult to be broken into bubbles having a smaller size, thus resulting in a poor effect of mixing the dust with water. Another air intake pipe in the related art is designed to have a non-constant cross section, and a simple stamping process generally is performed at a pipe mouth of the circular pipe so as to stamp the pipe mouth into a flat pipe. However, a cross-sectional flow area of such air intake pipe varies unevenly, and a flow loss of an air flow is great, thus increasing an energy consumption. In addition, another air intake pipe in the related art is designed as a circular pipe having a convergent cross section. However, a flow cross section of such air intake pipe has an equal length in each direction, and the cross-sectional flow area decreases evenly in a flowing direction, thus tending to result in a problem that large-particle garbage blocks the air intake pipe. Moreover, both the air intake pipe having the constant cross section and the air intake pipe having the convergent cross section may cause a violent impact of air on the water, such that the bubble is broken with a large noise and a water-air separation is influenced.

SUMMARY

Embodiments of the present disclosure seek to solve at least one of the problems existing in the related art to at least some extent. For that reason, an objective of the present disclosure is to provide a filter assembly, and a filtering performance thereof is good.

Another objective of the present disclosure is to provide a cleaner having the above filter assembly.

The filter assembly according to a first aspect of embodiments of the present disclosure includes: a tank configured to accommodate a liquid therein and having an air inlet and an air outlet; an air intake pipe connected to the air inlet, having an air output end located in the tank and extending towards the liquid or submerged in the liquid, and having a cross sectional area gradually increased along a fluid flow direction inside the air intake pipe.

With the filter assembly according to embodiments of the present disclosure, by processing the air output end of the air intake pipe to be the divergent pipe, a flow velocity of the dust-laden air being injected into the liquid from the air intake pipe is effectively reduced, such that a mixing time and a contact area of the dust-laden air and the liquid are increased, thus allowing a mixing effect of the dust-laden air and the liquid to be better, improving the filtering effect, reducing an impact between gas and liquid phases, and effectively suppressing the noise generated when the bubbles are broken. Furthermore, a splashing height of water is lowered, thus further facilitating the gas-liquid separation.

According to an embodiment of the present disclosure, the air output end is submerged in the liquid and extends forward horizontally, or extends inclinedly to the anterior inferior, or extends inclinedly to the anterior superior.

According to an embodiment of the present disclosure, a pipe mouth of the air output end is configured to be a flat mouth having a vertical height and a transverse length larger than the vertical height.

According to an embodiment of the present disclosure, the pipe mouth of the air output end has an outline configured to be a wavy line or a jagged line.

According to an embodiment of the present disclosure, a cross section of the pipe mouth is configured as an axisymmetric structure.

According to an embodiment of the present disclosure, a shape of a cross section of the air output end further includes at least one of a circular shape, an oval shape, and a long circular shape, and an inner surface of the air intake pipe has a smooth transition.

According to an embodiment of the present disclosure, the air intake pipe includes: a first pipe portion having a first end located outside the tank and a second end extending into the tank; and a second pipe portion located in the tank, having a first end connected to the second end of the first pipe portion and a second end configured as the air output end and submerged in the liquid.

According to an embodiment of the present disclosure, the first pipe portion is integral with the second pipe portion and fitted with the tank by inserting connection.

According to an embodiment of the present disclosure, the first pipe portion is integral with the tank and fitted with the second pipe portion by inserting connection.

According to an embodiment of the present disclosure, the filter assembly further includes: a water baffle uprightly disposed in the tank, located at a side of the air intake pipe away from the air outlet, and configured to divide a space above the liquid in the tank into a first cavity and a second cavity located respectively at two sides the water baffle, in which a flow passage is provided in the water baffle and/or between the water baffle and a level of the liquid, and configured to communicate the first cavity with the second cavity; and the second cavity is communicated with the air outlet.

A cleaner according to a second aspect of embodiments of the present disclosure includes: a dust suction duct and the filter assembly according to the first aspect of embodiments of the present disclosure, in which an air intake end of the air intake pipe is communicated with the dust suction duct.

In the cleaner according to embodiments of the present disclosure, by providing the filter assembly according to the above first aspect of embodiments of the present disclosure, the overall performance of the cleaner is improved.

Additional aspects and advantages of embodiments of present disclosure will be given in part in the following descriptions, become apparent in part from the following descriptions, or be learned from the practice of the embodiments of the present disclosure.

REFERENCE NUMERALS filter assembly 100;
tank 1; liquid A; air cavity B; tank base 11; tank cover 12; air inlet 13; air outlet 14;
air intake pipe 2; air intake end 21; air output end 22; pipe mouth 221; first pipe portion 201; second pipe portion 202; air output pipe 3; water baffle 4.

DETAILED DESCRIPTION

Reference will be made in detail to embodiments of the present disclosure. The same or similar elements and the elements having same or similar functions are denoted by same or similar reference numerals throughout the descriptions. The embodiments described herein with reference to drawings are explanatory, illustrative, and used to generally explain the present disclosure. The embodiments should not be construed to limit the present disclosure.

Various embodiments and examples are provided in the following description to implement different structures of the present disclosure. In order to simplify the present disclosure, elements and configurations in certain examples will be described. However, these elements and configurations are only explanatory and are not intended to limit the present disclosure. In addition, reference numerals or letters may be repeated in different examples of the present disclosure. This repeating is for the purpose of simplification and clarity, and does not refer to relations between different embodiments and/or configurations.

A filter assembly 100 according to a first aspect of embodiments of the present disclosure will be described with reference to FIGS. 1-6 in the following.

The filter assembly 100 according to the first aspect of embodiments of the present disclosure includes a tank 1, the tank 1 is configured to accommodate a liquid A therein and a portion above the liquid A within the tank 1 is configured as an air cavity B. For example, in examples shown in FIGS. 1 and 2, the tank 1 includes: a tank base 11 having an open top and a cube shape, and a tank cover 12 covering on the top of the tank base 11. The tank cover 12 is fitted with the tank base 11 so as to define a cube-shaped cavity, the liquid A is contained in the cavity and a portion above the top of the liquid A in the cavity may be configured as the air cavity B. A total volume of the cavity may be constant, such that when the liquid A is added to the cavity so as to increase a level of the liquid A in the cavity, a volume of the air cavity B decreases accordingly, and when the liquid A is removed from the cavity to decrease the level of the liquid A in the cavity, the volume of the air cavity B increases accordingly. Certainly, the shape and configuration of the tank 1 are not limited to this, as long as the tank 1 is a container capable of containing the liquid A therein.

Figure 1:
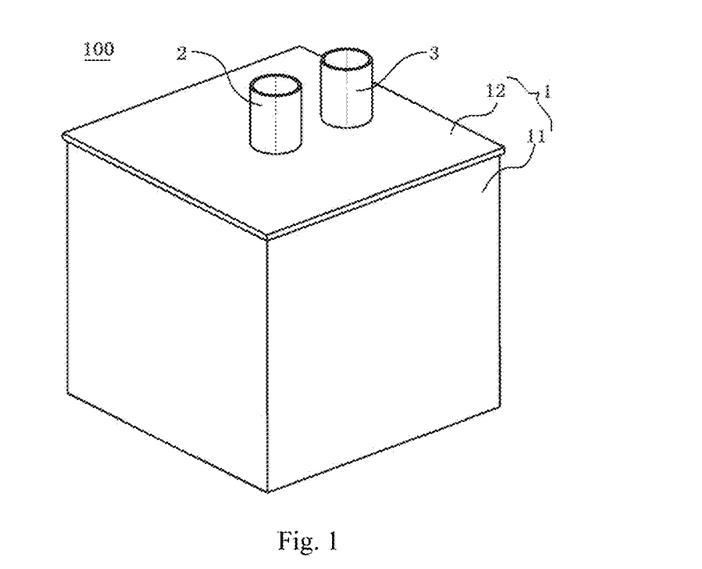
FIG. 1 is a schematic view of a filter assembly according to embodiments of the present disclosure.
Figure 2:
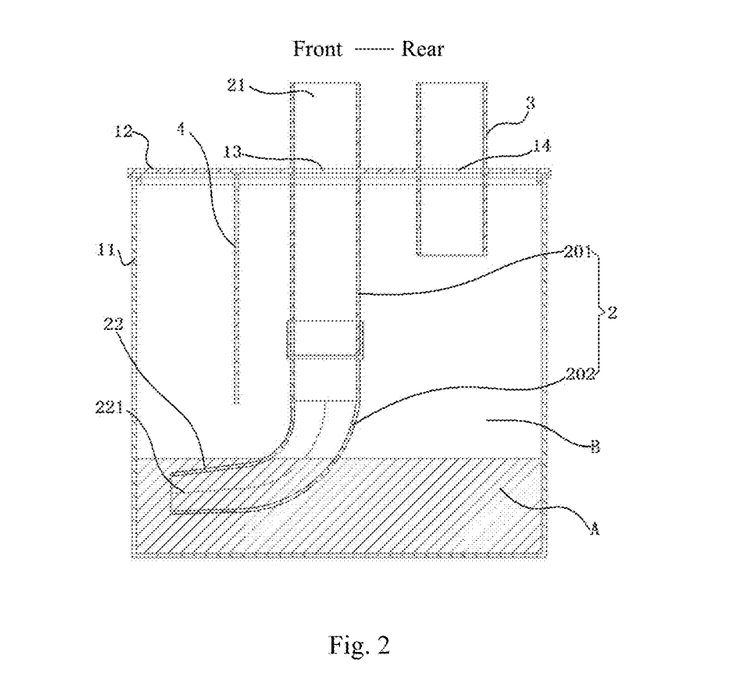
FIG. 2 is a sectional view of the filter assembly shown in FIG. 1.

Referring to FIGS. 1 and 2, the tank 1 is provided with an air inlet 13 and an air outlet 14. The air inlet 13 is used for importing a dust-laden air into the tank 1, and the dust-laden air mixes with the liquid A (such as water) in the tank 1 after entering the tank 1. Then, dust in the dust-laden air is filtered out completely by the liquid A, and a clean air enters the air cavity B and is further discharged out of the tank 1 from the air outlet 14. For example, in the examples shown in FIGS. 1 and 2, each of the air inlet 13 and the air outlet 14 may be formed in a top wall of the tank 1, for example, formed in the tank cover 12, thus improving a filtering effect and facilitating processing thereof. Certainly, positions at which the air inlet 13 and the air outlet 14 are provided are not limited to this, and may be adjusted according to actual requirements, so as to meet the actual requirements better.

The filter assembly 100 according to embodiments of the present disclosure further includes an air intake pipe 2, and the air intake pipe 2 is connected to the air inlet 13 so as to introduce the dust-laden air into the tank 1. That is, the air intake pipe 2 may be directly or indirectly connected to the air inlet 13 and communicated with the air inlet 13, such that the air intake pipe 2 is easy to be mounted and the dust-laden air can be introduced into the tank 1. For example, in the examples shown in FIGS. 1 and 2, an air intake end 21 of the air intake pipe 2 is located outside the tank 1, and an air output end 22 of the air intake pipe 2 is located inside the tank 1. In such case, the air intake pipe 2 runs through the air inlet 13 and is fitted and connected with the air inlet 13 by being inserted in the air inlet 13. Certainly, the present disclosure is not limited to this. In other embodiments of the present disclosure, the air intake pipe 2 may be disposed totally inside the tank 1, and the air intake end 21 of the air intake pipe 2 may be directly or indirectly connected to and communicated with the air inlet 13 (such example is not shown in the drawings).

As shown in FIG. 2, the air output end 22 of the air intake pipe 2 is located in the tank 1 and is submerged in the liquid A. Thus, the dust-laden air introduced from the air intake end 21 of the air intake pipe 2, after flowing through the air intake pipe 2, may be discharged into the liquid A through the air output end 22 of the air intake pipe 2, so as to contact the liquid A effectively and reliably, thus allowing the dust-laden air to be filtered by the liquid A better. In addition, the present disclosure is not limited to this, and in other examples of the present disclosure, the air output end 22 may extend towards the liquid A, so as to approach the liquid A, but not to contact the liquid A. In this way, a gas-liquid mixing may be ensured depending on an impact force of air.

Referring to FIGS. 2-5, the air intake pipe 2 according to embodiments of the present disclosure has a cross sectional area gradually increased along a fluid flow direction inside the air intake pipe 2, i.e. along a direction from the air intake end 21 of the air intake pipe 2 to the air output end 22 of the air intake pipe 2. That is, the air output end 22 of the air intake pipe 2 is configured as a divergent pipe, and thus a flow velocity of the dust-laden air being injected into the liquid A through the air intake pipe 2 can be reduced effectively.

With the air intake pipe 2 according to embodiments of the present disclosure, by processing the air output end 22 of the air intake pipe 2 as the divergent pipe, the flow velocity of the dust-laden air being injected into the liquid A through the air intake pipe 2 can be effectively reduced, so as to achieve following beneficial effects: (1) a mixing time of the dust-laden air and the liquid A is increased, so as to increase a mixing effect of the dust-laden air and the liquid A and thus to improve a filtering effect; (2) a contact area of the dust-laden air and the liquid A is increased, thus allowing pollutants in the air to be absorbed fully by the liquid A, and improving the filtering effect; (3) an impact between gas and liquid phases is reduced, thus effectively suppressing a noise generated when bubbles are broken; (4) a splashing height of water is reduced, thus facilitating a gas-fluid separation and increasing a humidity of the output air, etc.

In some embodiments of the present disclosure, the air output end 22 of the air intake pipe 2 extends forward horizontally, or extends inclinedly to the anterior inferior, or extends inclinedly to the anterior superior, so as to facilitate a fit between the air intake pipe 2 and the tank 1 of different structural shapes, thus improving the adaptability. That is, the air is not discharged out upward vertically or downward vertically at the air output end 22 of the air intake pipe 2. Thus, the splashing height of water may be lowered effectively, so as to allow the splashing water to be away from the air outlet 14. If so, not only a separation effect of air and liquid can be improved, but also a size of the tank 1 can be ensured to be as small as possible, thereby improving a utilization ratio of space and allowing the miniaturization of the filter assembly 100 to be possible.

Figure 3:
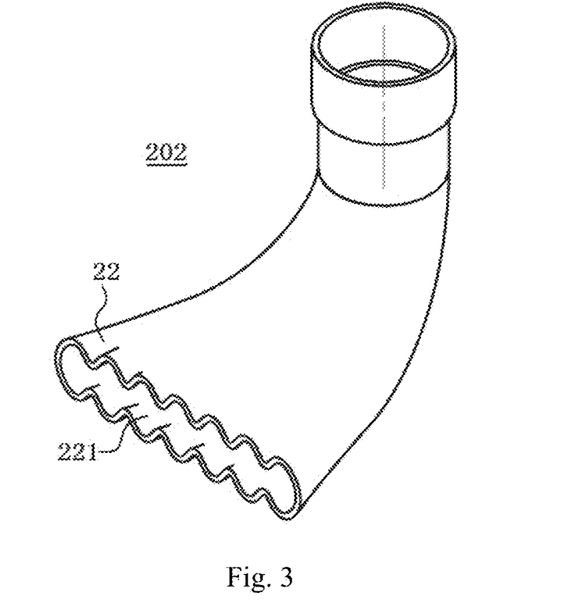
FIG. 3 is a schematic view of a second pipe portion shown in FIG. 2.
Figure 5:
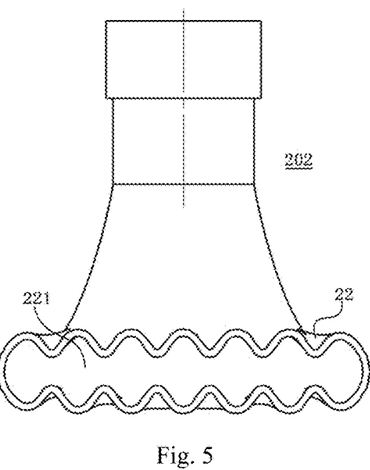
FIG. 5 is a front view of the second pipe portion shown in FIG. 3.

Preferably, referring to FIG. 3 and FIG. 5, a pipe mouth 221 of the air output end 22 of the air intake pipe 2 is configured to be a flat mouth having a vertical height and a transverse length larger than the vertical height. That is, the air output end 22 of the air intake pipe 2 is designed to have a horizontal flat section, i.e. a flattening direction of the pipe mouth 221 is same with a horizontal direction. Thus, under the premise of ensuring the air intake pipe 2 to be submerged under the liquid level, the liquid level can be lowered effectively, and an amount of the filtering liquid A can be decreased, so as to reduce a usage cost and a working weight of the tank, and also to decrease a size of the tank 1 correspondingly, thus facilitating the overall miniaturization of the filter assembly 100. Moreover, the dust-laden air may be mixed with the liquid A at a substantially equal height under the liquid level, thus improving the overall mixing effect of the liquid A and the dust-laden air discharged from the air output end 22 of the air intake pipe 2. In addition, the air intake pipe having the air output end 22 of a flattening design is beneficial to the miniaturization of the filter assembly 100.

Figure 4:
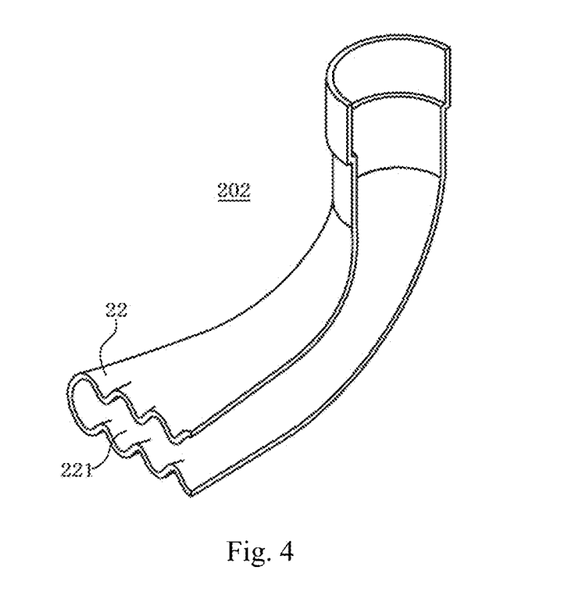
FIG. 4 is a schematic view showing the second pipe portion shown in FIG. 3, in which the second pipe portion is intersected.

In some embodiments of the present disclosure, referring to FIGS. 3-5, the pipe mouth 221 of the air output end 22 of the air intake pipe 2 has an outline configured to be a wavy line. That is, a cross section (i.e. an intersecting surface) of the air output end 22 of the air intake pipe 2 is a corrugated section. Thus, the pipe mouth 221 having the corrugated section may be helpful for a flat bubble to be broken into small bubbles, so as to increase the contact area of air and liquid, and improve the mixing effect of air and liquid. Furthermore, the pipe mouth 221 of the air output end 22 has a smooth and non-angular circumferential wall, thus effectively reducing the possibility that long striped garbage such as hair and long fibers blocks the pipe mouth 221. In addition, when the air output end 22 of the air intake pipe 2 is configured as the structure having the divergent shape, the flat mouth and the corrugated section, the cross section of the air output end 22 is large, thus not only decreasing the velocity of output air, reducing the impact between the gas and liquid phases, suppressing the noise generated when the bubbles are broken, but also reducing the possibility that the hair blocks the pipe mouth 221. Certainly, the present disclosure is not limited to this, and the outline of the pipe mouth 221 of the air output end 22 of the air intake pipe 2 may be configured to be a jagged line, thus achieving a similar effect.

Figure 6:
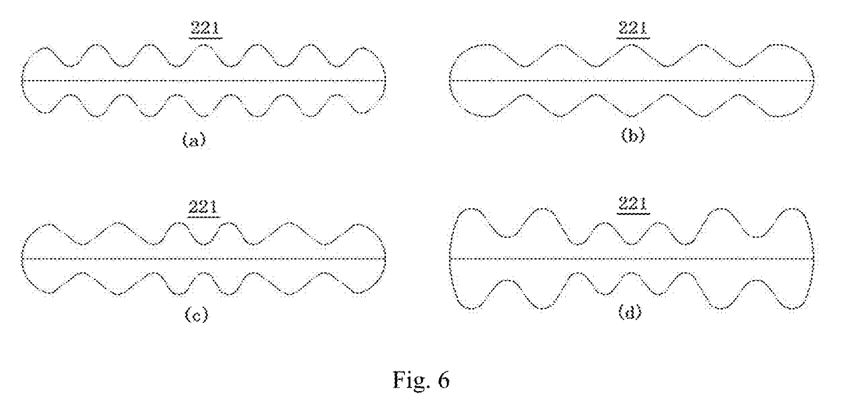
FIG. 6 is a schematic view showing multiple variants of a pipe mouth shown in FIG. 5.

Referring to FIG. 6, the outline of the pipe mouth 221 may use an adjustable wavy line, for example, a period, a wave length and an amplitude of the wavy line may be adjusted. As shown in FIG. 6 (a), the wave presents periodic changes with a constant amplitude. As shown in FIG. 6 (b), a wave length and a period of the wave are adjustable. As shown in FIG. 6 (c), the wave presents non-periodic changes with a constant amplitude. As shown in FIG. 6 (d), the wave presents non-periodic changes with non-constant amplitudes. Thus, an actual shape of the pipe mouth 221 may be adjusted according to actual requirements, which is helpful for the flat bubble to be broken into small bubbles, thus increasing the contact area of air and liquid, and improving the mixing effect of air and liquid.

Preferably, the cross section of the pipe mouth 221 is configured as an axisymmetric structure. For example, the cross section of the pipe mouth 221 may be configured as an axisymmetric structure symmetrical with respect to a transverse center line thereof, or may be configured as an axisymmetric structure symmetrical with respect to a vertical center line thereof. Thus, it is convenient to process the air intake pipe 2, and the air can be discharged out with a great effect. Certainly, the present disclosure is not limited to this, and the cross section of the pipe mouth 221 may be designed to be other special-shaped structures according to an actual configuration of the tank 1, so as to facilitate mounting.

In an embodiment of the present disclosure, a shape of a cross section of the air output end 22 of the air intake pipe 2 further includes at least one of a circular shape, an oval shape and a long circular shape, and an inner surface of the air intake pipe 2 has a smooth transition. For example, in examples shown in FIG. 3 and FIG. 5, the air intake pipe 2 has a circular cross section, a long circular cross section and a wavy cross section along an air flow direction therein respectively, and adjacent cross sections are smoothly connected with and transmitted to each other. Thus, the cross sectional area of the air intake pipe 2 may be increased evenly, and it is convenient to enlarge a transverse dimension of the air output end of the air intake pipe 2, so as to enlarge the contact area of air and liquid and generate many small bubbles, thus improving the filtering effect. Moreover, the smooth inner wall of the air intake pipe 2 may ensure that the air flow can flow fluently, so as to reduce the flow loss, the suction power loss and the energy consumption.

In an embodiment of the present disclosure, the air intake pipe 2 includes a first pipe portion 201 and a second pipe portion 202. A first end of the first pipe portion 201 is located outside the tank 1, and a second end of the first pipe portion 201 extends into the tank 1. The second pipe portion 202 is located in the tank 1, a first end of the second pipe portion 202 is connected to the second end of the first pipe portion 201, and a second end of the second pipe portion 202 is submerged in the liquid A. Thus, the corresponding mounting and processing are easy.

In the example shown in FIG. 2, the first pipe portion 201 may extend along an upright direction and run through the air inlet 13 in the tank cover 12. An upper end of the first pipe portion 201 is used for air inflow and is located outside the tank 1, and a lower end of the first pipe portion 201 is used for air outflow and is located inside the tank 1. The second pipe portion 202 is located in the tank 1 and is configured to have a substantial L shape, an upper end of the second pipe portion 202 is used for air inflow and is connected to the lower end of the first pipe portion 201, an lower end of the second pipe portion 202 is submerged in the liquid A and is opened forward horizontally for air outflow, and the lower end of the second pipe portion 202 is configured to be a divergent wavy flat-mouth pipe. Certainly, the present disclosure is not limited to this. In other embodiments of the present disclosure, the first pipe portion 201 may run through the tank 1 along other directions, for example, running through a side wall of the tank 1 along a horizontal direction, and the lower end of the second pipe portion 202 may be opened towards other directions. Herein, it should be noted that, the term "upright/uprightly" herein refers to a vertical direction or an inclined direction having an inclined angle of less than 45° with respect to the vertical direction.

In some examples of the present disclosure, for convenient processing, the first pipe portion 201 and the second pipe portion 202 may be integral with each other (for example, being molded integrally or being integrated by adhering or welding) and cannot be separated. Certainly, the present disclosure is not limited to this. In some other examples of the present disclosure, for the convenient processing, the first pipe portion 201 and the tank 1 may be integral with each other (for example, being molded integrally or being integrated by adhering or welding) and cannot be separated, and the first pipe portion 201 is fitted with the second pipe portion 202 by inserting connection. That is, the first pipe portion 201 is integrated with the tank 1 (such as the tank cover 12), while the second pipe portion 202 is processed separately, and the lower end of the first pipe portion 201 may be fitted and connected with the upper end of the second pipe portion 202 by insertion (i.e. an inserting-sleeving fit between the pipe mouths).

In addition, referring to FIGS. 1 and 2, the filter assembly 100 according to embodiments of the present disclosure may further include an air output pipe 3 connected to the air outlet 14, so as to discharge out the clean air after being filtered in the tank 1. For example, in the examples shown in FIGS. 1 and 2, an air output end of the air output pipe 3 is located outside the tank 1, and an air intake end of the air output pipe 3 is located inside the tank 1. In this way, the air output pipe 3 runs through the air outlet 14 and is connected to the air outlet 14 by being inserted therein. Certainly, the present disclosure is not limited to this. In some other embodiments of the present disclosure, the air output pipe 3 may be located outside the tank 1 totally, and the air intake end of the air output pipe 3 may be directly or indirectly connected to and communicated with the air outlet 14 (such example is not shown in the drawings).

Further, the filter assembly 100 according to embodiments of the present disclosure may further include a water baffle 4. The water baffle 4 may be uprightly disposed at a side of the air intake pipe 2 away from the air output pipe 3. The water baffle 4 divides a space above the liquid A in the tank 1 into a first cavity and a second cavity, and the first cavity and the second cavity are respectively located at two sides of a plane where the water baffle 4 is. A portion of the air intake pipe 2 located above the liquid A may be located in the second cavity, and a portion of the air intake pipe 2 submerged in the liquid A may extend and be opened toward a direction directly facing the first cavity. A volume of the first cavity is less than that of the second cavity, and the second cavity is communicated with the air outlet 14.

No matter whether the water baffle 4 is submerged in the liquid A or not, the water baffle 4 is provided with a flow passage configured to communicate the first cavity with the second cavity. When the water baffle 4 is not submerged in the liquid A, the flow passage configured to communicate the first cavity with the second cavity may be provided between the water baffle 4 and the level of the liquid A. For example, in the examples shown in FIGS. 1 and 2, the air output pipe 3 is disposed at a rear side of the air intake pipe 2, the water baffle 4 is located at a front side of the air intake pipe 2, the water baffle 4 extends downward from the tank cover 12 and a lower end of the water baffle 4 is spaced apart from the level of the liquid A in an up and down direction, so as to define the flow passage. Thus, the water baffle 4 may achieve an effect of blocking water.

A cleaner according to a second aspect of embodiments of the present disclosure includes: a dust suction duct and the filter assembly 100 according to the first aspect of embodiments of the present disclosure, in which the air intake pipe 2 is communicated with the dust suction duct. Thus, during a working process of the cleaner, the dust-laden air sucked by the cleaner is transported into the air intake pipe 2 through the dust suction duct, and when flowing through the air intake pipe 2 to the divergent, wavy and flat-long pipe mouth 221 of the air output end 22 of the air intake pipe 2, the dust-laden air may decelerate and gradually turn into multiple puffs of small bubbles. Then, the small dust-laden bubbles are mixed with the liquid A, and under a common function of the water baffle 4 and the tank 1, the dust-laden air and the liquid A are mixed violently in a region at the front side of the air intake pipe 2, so as to allow the dust to be fully filtered out by the liquid A. The clean air along with water drops therein moves from a lower side of the water baffle 4 to a region at a rear side of the water baffle 4, and since the accommodating area is enlarged, the flow velocity of the air is reduced, thus allowing the air to be effectively separated from the water drops therein. Eventually, the clean air without water drops therein may be discharged out from the air output pipe 3 in the tank 1, and be further conveyed to downstream ducts in the cleaner.

In the cleaner according to embodiments of the present disclosure, by providing the filter assembly 100 according to the above first aspect of embodiments of the present disclosure, the bubbles discharged out from the air intake pipe 2 of the filter assembly 100 may be broken into small bubbles, such that the mixing and filtering effects of the dust in the bubbles and the liquid A may be improved, and moreover, since the cross sectional area of the air intake pipe 2 changes evenly, the flow loss of the air flow is reduced, the suction power of the overall cleaner is improved, and the energy consumption is reduced. In addition, since the pipe mouth 221 of the air output end 22 of the air intake pipe 2 is configured to be the flat-long wavy structure, the probability that the garbage blocks the pipe mouth 221 is reduced, and moreover, the structure of the air output end 22 of the air intake pipe 2 may reduce the flow velocity of the air discharged thereat, so as to reduce the impact of the dust-laden air and the liquid A, increase the mixing time and the contact area of the dust-laden air and the water, lower the splashing height of water, and effectively suppress the noise generated when the bubbles are broken. To sum up, the performance of the cleaner is improved effectively. In addition, it should be noted that, other configurations and operations of the cleaner according to embodiments of the present disclosure are known by those skilled in the related art, and will not be described in detail herein.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise", and "counterclockwise" should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above" or "on top of" a second feature may include an embodiment in which the first feature is right or obliquely "on", "above" or "on top" of the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example" or "in some examples" in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A filter assembly, comprising:
   a tank configured to accommodate a liquid therein and having an air inlet and an air outlet; and
   an air intake pipe connected to the air inlet, having an air output end located in the tank and extending towards the liquid or submerged in the liquid, and having a cross sectional area gradually increased along a fluid flow direction inside the air intake pipe.

2. The filter assembly according to claim 1, wherein the air output end is submerged in the liquid and extends forward horizontally, or extends inclinedly to the anterior inferior, or extends inclinedly to the anterior superior.

3. The filter assembly according to claim 1, wherein a pipe mouth of the air output end is configured to be a flat mouth having a vertical height and a transverse length larger than the vertical height.

4. The filter assembly according to claim 1, wherein a pipe mouth of the air output end has an outline configured to be a wavy line or a jagged line.

5. The filter assembly according to claim 4, wherein a cross section of the pipe mouth is configured as an axisymmetric structure.

6. The filter assembly according to claim 4, wherein a shape of a cross section of the air intake pipe comprises at least one of a circular shape, an oval shape and a long circular shape, and an inner surface of the air intake pipe has a smooth transition.

7. The filter assembly according to claim 1, wherein the air intake pipe comprises:
   a first pipe portion having a first end located outside the tank and a second end extending into the tank; and
   a second pipe portion located in the tank, having a first end connected to the second end of the first pipe portion and a second end configured as the air output end and submerged in the liquid.

8. The filter assembly according to claim 7, wherein the first pipe portion is integral with the second pipe portion and fitted with the tank by inserting connection.

9. The filter assembly according to claim 7, wherein the first pipe portion is integral with the tank and fitted with the second pipe portion by inserting connection.

10. The filter assembly according to claim 1, further comprising:
    a water baffle uprightly disposed in the tank, located at a side of the air intake pipe away from the air outlet, and configured to divide a space above the liquid in the tank into a first cavity and a second cavity located respectively at two sides of the water baffle,
    wherein a flow passage is provided in the water baffle and/or between the water baffle and a level of the liquid, and configured to communicate the first cavity with the second cavity; and wherein the second cavity is communicated with the air outlet.

11. A cleaner, comprising:

a dust suction duct; and a filter assembly comprising:

a tank configured to accommodate a liquid therein and having an air inlet and an air outlet; and an air intake pipe connected to the air inlet, having an air output end located in the tank and extending towards the liquid or submerged in the liquid, and having a cross sectional area gradually increased along a fluid flow direction inside the air intake pipe, wherein an air intake end of the air intake pipe being communicated with the dust suction duct.

12. The cleaner according to claim 11, wherein the air output end is submerged in the liquid and extends forward horizontally, or extends inclinedly to the anterior inferior, or extends inclinedly to the anterior superior.

13. The cleaner according to claim 11, wherein a pipe mouth of the air output end is configured to be a flat mouth having a vertical height and a transverse length larger than the vertical height.

14. The cleaner according to claim 11, wherein a pipe mouth of the air output end has an outline configured to be a wavy line or a jagged line.

15. The cleaner according to claim 14, wherein a cross section of the pipe mouth is configured as an axisymmetric structure.

16. The cleaner according to claim 14, wherein a shape of a cross section of the air intake pipe comprises at least one of a circular shape, an oval shape and a long circular shape, and an inner surface of the air intake pipe has a smooth transition.

17. The cleaner according to claim 11, wherein the air intake pipe comprises:

a first pipe portion having a first end located outside the tank and a second end extending into the tank; and a second pipe portion located in the tank, having a first end connected to the second end of the first pipe portion and a second end configured as the air output end and submerged in the liquid.

18. The cleaner according to claim 17, wherein the first pipe portion is integral with the second pipe portion and fitted with the tank by inserting connection.

19. The cleaner according to claim 17, wherein the first pipe portion is integral with the tank and fitted with the second pipe portion by inserting connection.

20. The cleaner according to claim 11, wherein the filter assembly further comprises:

a water baffle uprightly disposed in the tank, located at a side of the air intake pipe away from the air outlet, and configured to divide a space above the liquid in the tank into a first cavity and a second cavity located respectively at two sides of the water baffle, wherein a flow passage is provided in the water baffle and/or between the water baffle and a level of the liquid, and configured to communicate the first cavity with the second cavity; and wherein the second cavity is communicated with the air outlet.

* * * * *